United States Patent

Crevenat et al.

(10) Patent No.: US 10,523,001 B2
(45) Date of Patent: Dec. 31, 2019

(54) TRANSIENT OVERVOLTAGE PROTECTION SYSTEM

(71) Applicant: CITEL, Sevres (FR)

(72) Inventors: Vincent Crevenat, Pembroke Pines, FL (US); Wang Hui, Shanghai (CN)

(73) Assignee: CITEL, Sevres (FR)

( * ) Notice: Subject to any disclaimer, the term of this patent is extended or adjusted under 35 U.S.C. 154(b) by 276 days.

(21) Appl. No.: 15/793,311

(22) Filed: Oct. 25, 2017

(65) Prior Publication Data

US 2018/0138697 A1 May 17, 2018

(30) Foreign Application Priority Data

Nov. 3, 2016 (FR) ..................................... 16 60638

(51) Int. Cl.
| | |
|---|---|
| *H02H 9/04* | (2006.01) |
| *H01H 83/10* | (2006.01) |
| *H02H 3/20* | (2006.01) |
| *H02H 9/00* | (2006.01) |
| *H01H 37/76* | (2006.01) |

(52) U.S. Cl.
CPC ............ *H02H 9/043* (2013.01); *H01H 83/10* (2013.01); *H02H 3/20* (2013.01); *H02H 9/005* (2013.01); *H02H 9/042* (2013.01); *H01H 2037/763* (2013.01)

(58) Field of Classification Search
CPC ........ H02H 9/005; H02H 9/042; H02H 9/043; H02H 3/20; H01H 83/10; H01H 2037/763
USPC ....................................................... 361/111
See application file for complete search history.

(56) References Cited

U.S. PATENT DOCUMENTS

| 4,288,833 A | * | 9/1981 | Howell | ..................... H02H 9/06 337/16 |
|---|---|---|---|---|
| 2006/0139832 A1 | | 6/2006 | Yates | |
| 2007/0217111 A1 | * | 9/2007 | Tseng | ..................... H01C 7/126 361/118 |
| 2012/0086540 A1 | * | 4/2012 | Duval | .................. H01H 37/761 337/1 |

(Continued)

FOREIGN PATENT DOCUMENTS

CN             101950956 A         1/2011

OTHER PUBLICATIONS

Search Report of priority application FR 1660638, dated Jul. 21, 2017.

*Primary Examiner* — Kevin J Comber

(74) *Attorney, Agent, or Firm* — Notaro, Michalos & Zaccaria P.C.

(57) ABSTRACT

A transient overvoltage protection system to be positioned in parallel with an equipment item to be protected, has at least three lines and includes three conductive branches intended to be connected to the three lines. The first and second conductive branches are equipped with first and second voltage-sensitive protection elements and are able to rise in temperature when the voltage between its terminals is higher than a voltage threshold. A thermally sensitive disconnection device comprising at least one thermofusible element in thermal contact with at least one of the first and second protection elements, is arranged so as to keep the three branches in a connected position, the thermally sensitive disconnection device having an elastic return device exerting a force tending to bring the three conductive branches to a disconnected position.

18 Claims, 4 Drawing Sheets

(56) References Cited

U.S. PATENT DOCUMENTS

2014/0092514 A1   4/2014   Chen

* cited by examiner

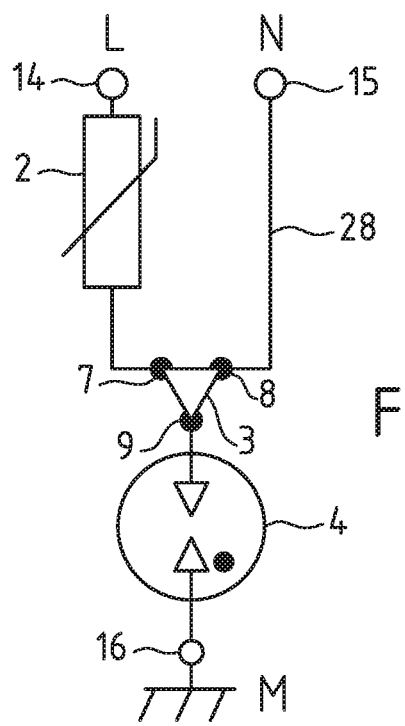
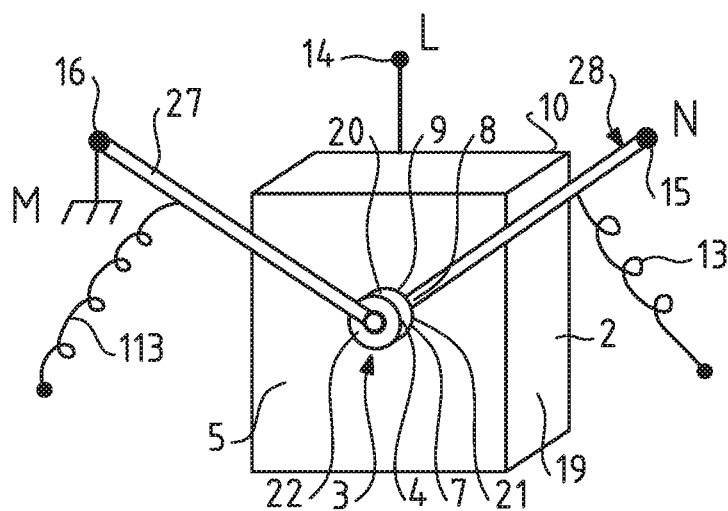
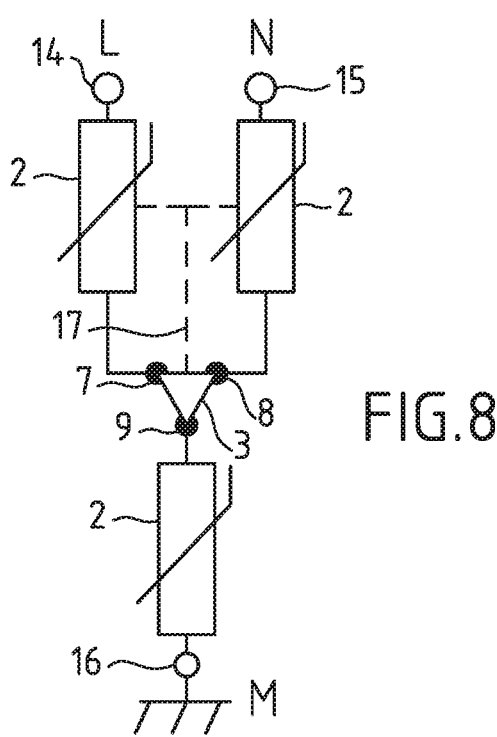

TRANSIENT OVERVOLTAGE PROTECTION SYSTEM

TECHNICAL FIELD

The invention relates to the field of overvoltage protection components for an electrical equipment item.

TECHNOLOGICAL BACKGROUND

To protect an electrical equipment item, it is standard practice to use, between the two lines of an alternating mains supply, a metal oxide varistor, notably zinc oxide, mounted in series on one side with a thermofusible disconnection element and on the other side with a gas discharge arrestor.

Such a device works theoretically as follows: the gas discharge arrestor supports practically all the alternating voltage of the mains supply. Indeed, the stray capacitance of the gas discharge arrestor is of the order of a picofarad whereas the stray capacitance of the varistor is from a few to a few tens of nanofarads. When an overvoltage occurs, it causes the gas discharge arrestor to fire, which can be extinguished only if the so-called follow current, which subsequently passes through it, becomes sufficiently low. It is the resistance of the varistor which ensures the limiting of the follow current and allows the extinguishing of the gas discharge arrestor.

When an overvoltage protection device has operated a certain number of times or continuously following a prolonged overvoltage, its components come to the end of their life. For a gas discharge arrestor, the end of life corresponds to a short-circuit condition. On the other hand, for a varistor, the end of life can be reflected by an explosion for pulse phenomena or by a great reduction of its internal resistance (tending towards short-circuit) which can often go as far as its ignition. For safety, the gas discharge arrestor can be designed for its capacity to carry energy pulses linked to the overvoltages to be lower than that of the varistor. In this way, it is the gas discharge arrestor which comes first to its end of life and which is short-circuited.

The voltage of the mains supply is then totally diverted to the varistor which heats up and leads to the melting of the thermofusible element and thermal disconnection, that is to say that the protection device is taken out of service.

However, it is difficult to ensure the reliability of the disconnection produced by the melting of the thermofusible element.

SUMMARY OF THE INVENTION

One idea on which the invention is based is to provide a transient overvoltage protection device that ensures a total disconnection at the end of life of the components, by a simultaneous action of the disconnection system disconnecting all the components that make up the transient overvoltage protection device.

According to one embodiment, the invention provides a transient overvoltage protection system intended to be positioned in parallel to an equipment item to be protected, the protection system comprising at least three lines consisting of a first line, a second line and a ground; the protection system comprising:

a first, a second and a third conductive branches which are intended to be connected respectively to the three lines and of which each comprises a first end intended to be connected to one of the three lines and a second end that can be connected to the second end of the other two conductive branches;

the first and the second conductive branches being equipped with a first and a second voltage-sensitive protection elements; each of the first and second voltage-sensitive protection elements having two terminals and being arranged to allow a flow of current between the first and the second ends of the respective conductive branch when the voltage between said two terminals is higher than a voltage threshold and to inhibit a flow of current between the first and the second ends of the respective conductive branch when the voltage between said two terminals is lower than the voltage threshold; each voltage-sensitive protection element being able to rise in temperature when the voltage between its terminals is higher than said voltage threshold; and a thermally sensitive disconnection device comprising at least one thermofusible element which is in thermal contact with at least one of the first and second voltage-sensitive protection elements; the thermofusible element being electrically conductive at ambient temperature and being capable of melting above a temperature threshold; the thermofusible element being arranged so as to keep the second ends of the three branches in a connected position in which an electrical connection is assured between the second ends of the first, second and third conductive branches; the thermally sensitive disconnection device comprising an elastic return device exerting a force tending to bring the first, second and third conductive branches to a disconnected position in which the second ends of the first, second and third conductive branches are placed at a distance from one another so as to simultaneously disconnect the first, second and third branches from one another upon the melting of the thermofusible element.

By virtue of these features, electrical equipment items connected to the first electrical line or to the second electrical line are protected against the transient overvoltages that are exerted between the first electrical line and the second electrical line. By virtue of these features, the transient overvoltage protection device is protected against a possible fire caused by the varistor when it comes to the end of life.

The device is particularly advantageous in that it physically separates the ends of the first, second and third conductive branches upon the melting of the braze, such that the electrical contacts are simultaneously broken upon a rise in temperature.

There are many equipment items that can be protected by a protection device according to the invention. For example electronic, telephone, computing, photovoltaic, light-emitting diode lighting, wind turbine, radio communication and other such equipment items.

According to embodiments, such a device comprises one or more of the following features:

The transient overvoltage protection system is capable of being positioned in parallel to an equipment item to be protected comprising three or more lines.

In one embodiment, the transient overvoltage protection system is capable of being positioned in parallel to an equipment item to be protected comprising four or five lines. In this example, it comprises four conductive branches of which the second ends are all star-connected to one another.

For example, when the equipment item to be protected comprises five lines, the first three are phase lines, the fourth is a neutral line and the last is a ground line. When the equipment item to be protected comprises four lines, the first two are phase lines, the third is a neutral line and the last is a ground line.

In one embodiment, the transient overvoltage protection system is capable of being positioned in parallel to an equipment item to be protected comprising three lines. In this example, it comprises three conductive branches of which the second ends are Y-connected to one another.

For example, the three lines are phase, neutral and ground lines. In another example, the three lines are lines of positive and negative polarity and a ground.

In one embodiment, the second ends of the first, second and third conductive branches are fixed to one another by the thermofusible element.

In one embodiment, the second end of the first conductive branch is formed by one of the two terminals of the first voltage-sensitive protection element.

In one embodiment, the second end of the second conductive branch is formed by one of the two terminals of the second voltage-sensitive protection element.

In one embodiment, the third conductive branch is equipped with a third voltage-sensitive protection element having two terminals and being arranged to allow a flow of current between the first and the second ends of the third conductive branch when the voltage between said two terminals is higher than a voltage threshold and to inhibit a flow of current between the first and the second ends of the conductive branch when the voltage between said two terminals is lower than the voltage threshold; and being also capable of rising in temperature when the voltage between its terminals is higher than said voltage threshold.

In one embodiment, the second end of the third conductive branch is formed by one of the two terminals of the third voltage-sensitive protection element.

The first, second and third protection elements can be a varistor, a discharge arrestor or a semiconductor element such as a diode. For example, the first and second protection elements are varistors and the third protection element is a discharge arrestor. For example, all three protection elements are varistors.

In one embodiment, the second ends of the first, second and third conductive branches can move away from one another.

In one embodiment, the return device comprises a disconnection flap pressed elastically on to the second ends of the three conductive branches at their fixing point in order to exert a force tending to separate the second ends of the three conductive branches from one another.

Upon the melting of the thermofusible element, the disconnection flap is inserted between the second ends of the three conductive branches. The disconnection flap is produced in an electrically insulating material, for example plastic.

In one embodiment, the first and the second protection elements are positioned on either side of the disconnection flap.

By virtue of these features, the thermofusible element can benefit from the temperature rise of each of the protection elements.

In one embodiment, the first and the second conductive branches are positioned on either side of the disconnection flap.

In one embodiment, two of the three conductive branches are positioned in a direction parallel to one another and the last of the three conductive branches is positioned in a direction at right angles to the other two conductive branches, the second ends of each of the conductive branches being inclined to one another so as to be held together by the thermofusible element, and the disconnection flap has a profile bevelled by three slopes at right angles to one another in order for this profile to complement the assembly formed by the inclination of each of the second ends of the conductive branches and capable of being inserted between the three second ends of the conductive branches upon the melting of the thermofusible element.

In one embodiment, the thermofusible element is a thermofusible braze produced on the three second ends of the conductive branches.

In one embodiment, the second end of the third conductive branch is inserted between the second ends of the first and second conductive branches and the return device comprises a return member exerting on the second end of the third conductive branch a force tending to separate said second end of the third conductive branch from the second ends (7 and 9, 8) of the first and second conductive branches.

In one embodiment, the second ends of the first and second conductive branches are placed at a distance from one another in the connected position.

In one embodiment, the thermofusible element is a solid tin-based alloy ball ensuring an electrical connection between the second ends of the first and second conductive branches and covered by a thermofusible material capable of melting upon a temperature rise and of being allocated to one of the terminals of one and/or the other of the first and second voltage-sensitive protection elements upon a temperature rise in order to increase the wettability of said terminal for the molten tin alloy.

In one embodiment, the return device further comprises a return member exerting on the second end of the second conductive branch a force tending to separate the second end of the second conductive branch from the second end of the first conductive branch.

In one embodiment, the second protection element is a gas discharge arrestor of which one of the two terminals constitutes the second end of the second conductive branch.

In one embodiment, the thermally sensitive disconnection device comprises a first and a second thermofusible elements, the first thermofusible element being positioned between a first portion and a second portion of the first conductive branch; the first portion and the second portion respectively comprising the first end and the second end of the first conductive branch; the second thermofusible element being positioned between a first portion and a second portion of the second conductive branch; the first portion and the second portion respectively comprising the first end and the second end of the second conductive branch; the return device comprising a first return member exerting on the second portion of the first conductive branch a force tending to separate it from the first portion of the first conductive branch so as to separate the first portion from the second portion of the first conductive branch upon the melting of the first thermofusible element and a second return member exerting on the second portion of the second conductive branch a force tending to separate it from the first portion of the second conductive branch so as to separate the first portion from the second portion of the second conductive branch upon the melting of the second thermofusible element; the second end of the third conductive branch being in connected position sandwiched between the second ends of the first and second conductive branches; the return device further comprising a third return member exerting on the second end of the third branch a force tending to separate the second end of the third conductive branch from the second ends of the first and of the second conductive branches so as to move the second end of the third conductive branch in relation to the second ends of the first and second conductive branches when, because of the melting of one and/or the other of the two thermofusible elements, the second end of the third conductive branch is no longer sandwiched between the second ends of the first and second conductive branches.

In one embodiment, the first and the second conductive branches comprise a third and a fourth voltage-sensitive protection elements, the first and the second voltage-sensitive protection elements being respectively positioned on the first portion of the first and of the second conductive branches and the third and the fourth voltage-sensitive protection elements being respectively positioned on the second portion of the first and of the second conductive branches.

In one embodiment, the first thermofusible element is fixed between one of the terminals of the first voltage-sensitive protection element and one of the terminals of the third voltage-sensitive protection element and the second thermofusible element is fixed between one of the terminals of the second voltage-sensitive protection element and one of the terminals of the fourth voltage-sensitive protection element.

In one embodiment, the voltage-sensitive protection elements are chosen from varistors, discharge arrestors and semiconductors.

In one embodiment, the first and second voltage-sensitive protection elements are varistors and the third and the fourth voltage-sensitive protection elements are gas discharge arrestors.

In one embodiment, the second end of the first conductive branch is formed by one of the two terminals of the third voltage-sensitive protection element.

In one embodiment, the second end of the second conductive branch is formed by one of the two terminals of the fourth voltage-sensitive protection element.

In one embodiment, the first end of the first conductive branch is intended to be connected to the phase.

In one embodiment, the first end of the second conductive branch is intended to be connected to the neutral or to the ground.

In one embodiment, the first and second voltage-sensitive protection elements are varistors, the first and second conductive branches are intended to be connected to the phases or to neutral and the phase, and the third conductive branch is intended to be directly connected to the neutral or to the ground. In this embodiment, the third conductive branch does not include a protection element.

In one embodiment, the device further comprises a housing in which the device is arranged. By virtue of these features, the device is compact.

Welds or brazes produced between any pair of elements of the components selected from the connection terminals, the discharge arrestor or varistor electrodes are electrically conductive welds or brazes. In one embodiment, the welds or brazes are produced in metal whose melting point is higher than the melting point of the thermofusible braze.

In one embodiment, the thermofusible braze comprises an alloy of which tin is the main component. The alloy also comprises one or more elements selected from the list consisting of: Pb, Cu, Zn, Ag, Bi, In, Sb in order to select a melting point of the thermofusible braze which is lower than the melting point of tin. For example, the thermofusible braze comprises one of the alloys selected from the list consisting of: SnPbAg, SnCuAg, and SnBi.

According to one embodiment, the varistor(s) is (are) produced in metal oxide.

According to one embodiment, the discharge arrestor(s) is (are) (a) gas discharge arrestor(s), also called "gas discharge tube (GDT)" or "gas-filled discharge arrestor (GSG)".

According to one embodiment, the semiconductor(s) is (are) (an) avalanche diode(s), also called avalanche breaking diodes (ABD). According to one embodiment, the varistor(s) is(are) selected from the group comprising a varistor of any possible dimensional form, for example circular, tubular, rectangular, square or various other forms.

According to one embodiment, the varistor(s) is (are) (a) zinc oxide (ZnO) varistor(s).

BRIEF DESCRIPTION OF THE FIGURES

The invention will be better understood, and other aims, details, features and advantages thereof will emerge more clearly from the following description of several particular embodiments of the invention, given purely in an illustrative and nonlimiting manner, with reference to the attached drawings.

In these drawings:

FIG. 6 is an electrical diagram of an overvoltage protection system according to a third embodiment of the invention, FIG. 7 is a schematic view of the protection system of FIG. 6, FIG. 8 is an electrical diagram of an overvoltage protection system according to a fourth embodiment of the invention.

DETAILED DESCRIPTION OF THE INVENTION

Figure 1:
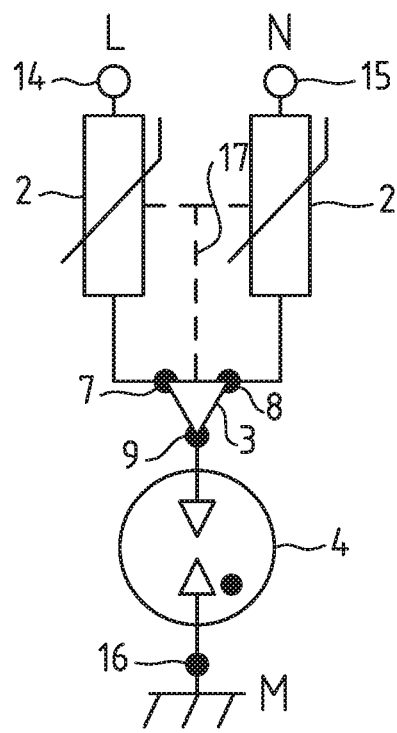
FIG. 1 is an electrical diagram of an overvoltage protection system according to a first embodiment of the invention.

Several embodiments of a system 1 intended to protect an electrical equipment item against surges in voltage will now be presented with reference to the figures.

The electrical diagram of a protection device 1 according to a first embodiment of the invention will be described in relation to FIG. 1. The device 1 comprises a gas discharge arrestor 4 having a first electrical terminal 16 and a second electrical terminal 9. The device 1 further comprises a first varistor having a first electrical terminal 7 and a second electrical terminal 14, as well as a second varistor 2 having a first electrical terminal 8 and a second electrical terminal 15.

The discharge arrestor 4 and the two varistors 2 are connected to one another by one of their electrical terminals so as to form an electrical Y connection. More specifically, the first electrical terminal 16 of the discharge arrestor 4 is connected to the ground M and the respective first electrical terminals 14, 15 of the varistors 2 are respectively connected to an electrical terminal L and an electrical terminal N intended to connect two electrical lines of the circuit or electrical equipment item to be protected.

The discharge arrestor 4 and the two varistors 2 are connected to one another by their respective second electrical terminals 7, 8 and 9 via a thermofusible braze 3.

The electrical lines can be all conductive serving to bring electrical energy at a low or medium voltage to an electrical equipment item. A thermal bridge 7 makes it possible to diffuse the heat emitted by the varistors 2 to the thermofusible braze 3.

Now, the mechanical structure of the protection device 1 of FIG. 1 will be described with reference to FIGS. 2 and 3.

Figure 2:
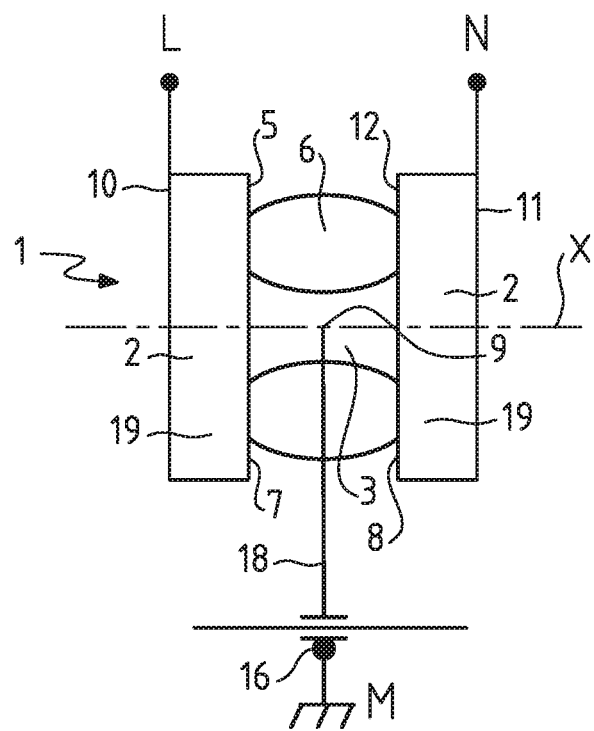
FIG. 2 is a schematic front view of the protection system of FIG. 1.

The two varistors 2 are varistors of rectangular form each comprising a rectangular wafer of zinc oxide and a respective pair of electrodes 10, 5 and 11, 12 also rectangular placed on either side of the zinc oxide wafer 19, as represented in FIG. 2.

Figure 3:
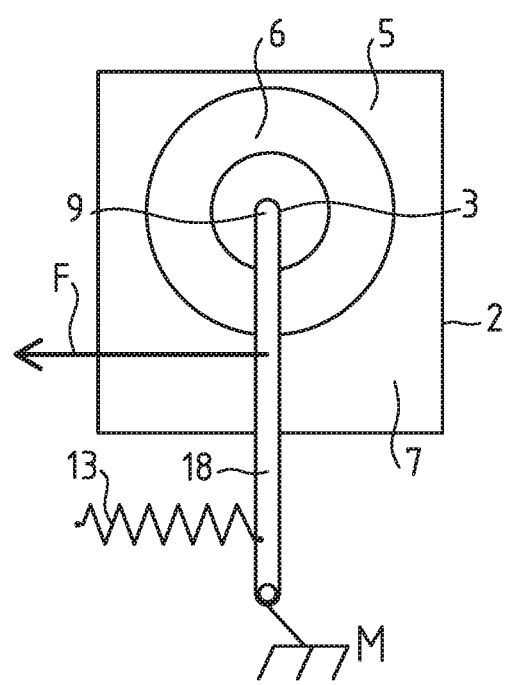
FIG. 3 is a schematic front view of the protection system of FIG. 1.

The device 1 also comprises a gas discharge arrestor 4 (not represented in FIGS. 2 and 3).

In a connected state of the device 1 represented in FIGS. 2 and 3, the two varistors 2 are positioned in two parallel planes at a short distance from one another. The first electrode 10 of the first varistor 2 corresponds to the electrical terminal 14. The second electrode 5 of the first varistor 2 corresponds to the electrical terminal 7. The first electrode 12 of the second varistor 2 corresponds to the electrical terminal 15, and the second electrode 11 of the second varistor 2 corresponds to the electrical terminal 8.

The electrodes 5 and 12 are fixed and electrically connected to one another via the thermofusible braze 3.

The thermofusible braze 3 is a substantially cylindrical section of axis X at right angles to the planes of the varistors 2. The thermofusible braze 3 is produced in conductive metal and each end of the section is respectively welded to one of the electrodes 5 and 12.

The discharge arrestor 4 (not represented) is fixed and electrically connected to a conductive metal rod 18 having two ends. The conductive metal rod 18 is positioned in a plane parallel to the two varistors 2, at a distance from the electrodes 5 and 12 and between the two varistors 2.

The thermofusible braze holds and electrically connects the first end of the conductive metal rod 18, corresponding to the electrical terminal 9. The second end corresponds to the electrical terminal 16.

A spring 13 exerts a return force F on the conductive metal rod 18 in a direction transversal to the axis X.

Thus, upon an overvoltage exceeding a predetermined threshold of the device 1, the varistors 2 produce a temperature rise that is transmitted to the thermofusible braze 3 via the thermal bridge 17.

This temperature rise leads to the melting of the thermofusible braze 3 which is no longer able to hold the first end of the conductive metal rod 18, torn away by the return force F exerted by the spring 13. At the same time, the thermofusible braze 3 no longer ensures the electrical connection between the electrodes 5 and 12.

In fact, the thermofusible braze 3 is surrounded by thermoactive material 6 on its cylindrical surface. The thermoactive material 6 is able to melt upon a temperature rise lower than the melting point of the thermofusible braze 3.

The thermoactive material 6 makes it possible to increase the spreading coefficient of the thermofusible braze 3 in the liquid state on the electrodes 5 and 12 in order for the thermofusible braze 3 to be transformed into a metallic film incapable of ensuring the electrical connection between the electrodes 5 and 12.

Thus, either upon a temperature rise due to a voltage rise, above a predetermined threshold of the device 1, or to the wear of the device 1, the melting of the thermofusible braze 3 causes a simultaneous electrical disconnection of the electrical terminals 7, 8 and 9.

The device 1 then switches to a disconnected state (not represented) in which the electrical terminals 7, 8 and 9 are placed at a distance from one another.

In a variant of the embodiment represented in FIGS. 1 to 3, the discharge arrestor is replaced by a conductive connection. The operation of the disconnection is unchanged.

Figure 4:
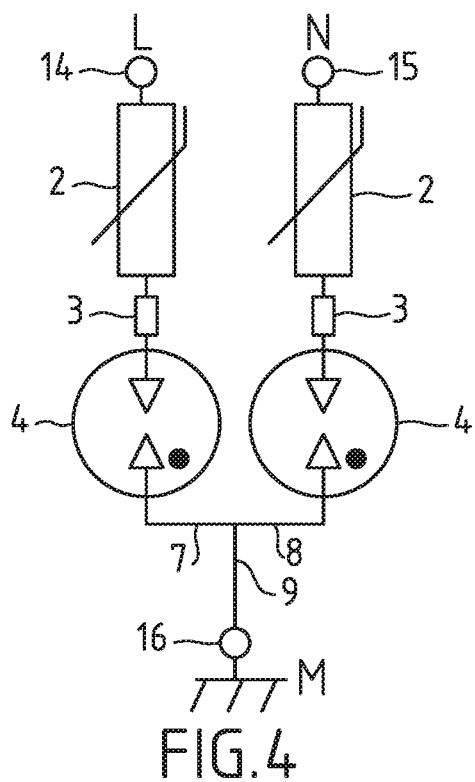
FIG. 4 is an electrical diagram of an overvoltage protection system according to a second embodiment of the invention.
Figure 5:
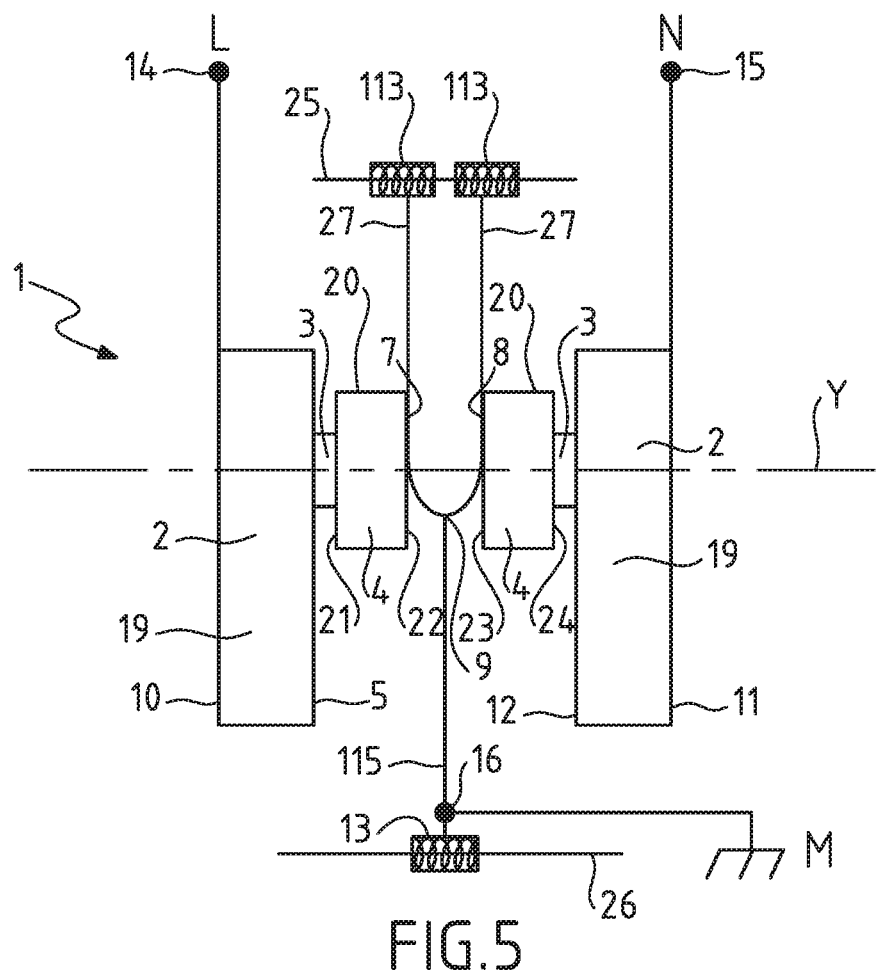
FIG. 5 is a schematic view of the protection system of FIG. 4.

A second embodiment of the invention will be presented with reference to FIGS. 4 and 5.

The electrical diagram of a protection device 1 according to the second embodiment of the invention will be described in relation to FIG. 1.

The device 1 comprises two assemblies each consisting of a discharge arrestor 4 and a varistor 2 in series. In each assembly, the varistor 2 and the discharge arrestor 4 are connected electrically via a thermofusible braze 3. The discharge arrestor 4 is also fixed mechanically to the varistor 2 by the thermofusible braze 3.

The first assembly has a first electrical terminal 14 and a second electrical terminal 7. The second assembly has a first electrical terminal 15 and a second electrical terminal 8.

The first electrical terminals 14 and 15 of the varistors 2 are respectively connected to an electrical terminal L and an electrical terminal N intended to connect two electrical lines of the circuit or electrical equipment item to be protected.

The second electrical terminals 7 and 8 are connected electrically with an electrical terminal 9 connected to the ground by an electrical terminal 16.

FIG. 5 represents the structure of the device 1 of FIG. 4, in a connected position.

The two varistors 2 are of a construction that is identical to those described with reference to FIG. 2, and the reference numerals denoting the same elements are identical.

The two varistors 2 are separated from one another. The electrode 5 of the first varistor faces the electrode 12 of the second varistor. The two discharge arrestors 4 each comprise a substantially cylindrical discharge arrestor body 20 and two discharge arrestor electrodes. The first discharge arrestor 4 has a first discharge arrestor electrode 21 and a second discharge arrestor electrode 22 on either side of the discharge arrestor body 20. The second discharge arrestor 4 has a first discharge arrestor electrode 24 and a second discharge arrestor electrode 23 on either side of the discharge arrestor body 20.

The electrodes 21, 22, 23 and 24 are of disc form and are positioned on the discharge arrestor body 4 in planes at right angles to the axis Y of the cylindrical discharge arrestor bodies 4.

Each discharge arrestor body 20 is capable of generating an electrical arc between the two electrodes situated on either side of the discharge arrestor body 20 and of heating up when the voltage imposed between the two electrodes exceeds a threshold.

The device 1 further comprises two rods 27 positioned in a plane at right angles to the axis Y. Each of the two discharge arrestors 4 is fixed to a first end of a respective rod 27.

The second end of each of the two rods is mounted to rotate about a rod rotation axis 25. The rod rotation axis 25 is parallel to the axis Y. Springs 113 exert a rotational force of axis 25 on the rods 27.

The first electrode 21 of the first discharge arrestor 4 is mechanically fixed and electrically connected to the second electrode 5 of the first varistor 2. For that, the electrode 21 is positioned on the electrode 5 in such a way that the two surfaces of the electrodes 21 and 5 are in contact. The two surfaces are welded by a thermofusible braze 3. The first discharge arrestor electrode 24 of the second discharge arrestor 4 is fixed and connected in the same way to the electrode 12 of the second varistor 2.

In this way, the second electrodes 22 and 23 of the discharge arrestors 4 are in parallel planes separated by a predetermined distance and face one another.

The springs 113 exert an elastic force on the discharge arrestors 4 tending to detach the two discharge arrestors 4 from the varistors 2 to move them away from the electrodes 5 and 12.

The device 1 further comprises a conductive metal rod 115.

The conductive metal rod 115 is electrically connected by a first end to the electrical terminal 16.

The first end of the conductive metal terminal is elastically mounted to rotate about a rotation axis 26 parallel to the axis Y. The conductive metal rod 115 is positioned in a plane at right angles to the axes 26 and Y.

The second end of the conductive metal rod 115 is equipped with a U-shaped metal plate spring fixed to the second end by the centre of the U. The elastic plate spring corresponds to the electrical terminal 9.

The second end of the conductive metal rod 115 is positioned in the space between the two electrodes 22 and 23 of the discharge arrestors 4 so that the branches of the U are elastically bearing on the second electrodes 22 and 23 of the discharge arrestors 4.

Thus, the branches of the U ensure an electrical connection between the second electrodes 22 and 23 of the discharge arrestors 4 and the electrical terminal 16.

A spring 13 exerts a return force tending to separate the second end of the conductive metal rod 115 from the discharge arrestors 4, while the branches of the U elastically hold the second end of the conductive metal rod 115 between the second electrodes 22 and 23 of the discharge arrestors 4.

Preferentially, the springs 13 exert a return force in a direction of rotation opposing the springs 113.

The device 1 switches from the connected position to the disconnected position upon the melting of the thermofusible brazes 3. Upon the melting of the thermofusible brazes 3, the rods 27 drive the discharge arrestors 4 away from the varistors 2, thus cutting any electrical connection between the electrical terminals 14 and 15.

The electrical diagram of a protection device 1 according to a third embodiment of the invention will be described in relation to FIG. 6. The device 1 comprises a discharge arrestor 4 having a first electrical terminal 16 and a second electrical terminal 9. The device 1 further comprises a varistor 2 having a first electrical terminal 7 and a second electrical terminal 14. The device 1 also comprises an electricity-conducting branch 28 having a first electrical terminal 15 and a second electrical terminal 8.

The discharge arrestor 4, the varistor 2 and the electricity-conducting branch 28 are connected to one another by one of their electrical terminals so as to form a Y-shaped electrical diagram. More specifically, the first electrical terminal 16 of the discharge arrestor 4 is connected to the ground M and the first electrical terminal 14 of the varistor 2 is connected to an electrical terminal L. The first electrical terminal 15 of the electricity-conducting branch 28 is connected to an electrical terminal N.

The electrical terminal L and the electrical terminal N are intended to connect two electrical lines of the electrical circuit or equipment item to be protected.

The discharge arrestor 4, the varistor 2 and the electricity-conducting branch 28 are connected to one another by their respective second electrical terminals 7, 8 and 9 via a thermofusible braze 3.

Now, the mechanical structure of the protection device 1 of FIG. 6 will be described with reference to FIG. 7.

The varistor 2 is a varistor of rectangular form comprising a rectangular wafer of zinc oxide and a pair of electrodes 10 and 5 placed on either side of the zinc oxide wafer 19, as represented in FIG. 7.

The device 1 also comprises a gas discharge arrestor 4. The gas discharge arrestor 4 comprises a substantially cylindrical discharge arrestor body 20 and two discharge arrestor electrodes 21 and 22 in disc form at right angles to the axis of the discharge arrestor body 20. The first discharge arrestor electrode 21 and the second discharge arrestor electrode 22 are positioned on either side of the discharge arrestor body 20. The second electrode 10 of the varistor 2 corresponds to the electrical terminal 14.

The first electrode 21 of the discharge arrestor 4 is mechanically fixed and electrically connected to the second electrode 5 of the varistor 2.

The conductive branch 28 consists of a rigid metal rod. A first end of the conductive branch 28 is mechanically fixed and electrically connected to the first electrode 21 of the discharge arrestor 4 and to the second electrode 5 of the varistor 2.

For that, the end 8 of the conductive branch 28 is positioned between the electrode 21 and the electrode 5 whereas the electrode 21 and the electrode 5 are positioned in two parallel planes close to one another.

Thus, the end 8 of the conductive branch 28 is in contact with the two surfaces of the electrodes 21 and 5. The electrodes 21 and 5 and the end of the conductive branch 28 are welded by a thermofusible braze 3.

The conductive branch 28 is also fixed to the end of a spring 13 capable of exerting, on the end of the conductive branch 28, an elastic return force in a plane at right angles to the axis of the cylindrical body 20. The elastic return force tends to tear the end of the conductive branch 28 from its position between the two electrodes 21 and 5.

The device 1 further comprises an electricity-conducting metal rod 27. The metal rod 27 is positioned in a plane at right angles to the axis of the cylindrical body 20. The metal rod 27 corresponds to the electrical terminal 16.

The second electrode 22 of the discharge arrestor 4 is welded to the end of the metal rod 27.

The metal rod 27 is also fixed to the end of a spring 113 capable of exerting, on the end of the metal rod 27, an elastic return force in a plane at right angles to the axis of the cylindrical body 20. The elastic return force tends to tear the discharge arrestor 4 from its position on the end 8 of the conductive branch 28.

Thus, upon a melting of the thermofusible braze 3, the end 8 of the conductive branch 28 and the two surfaces of the electrodes 21 and 5 are disconnected simultaneously by the simultaneous separation of the end 8 of the conductive branch 28 on one side and of the discharge arrestor 4 on the other.

The electrical diagram of a protection device 1 according to a fourth embodiment of the invention will be described in relation to FIG. 8.

The electrical diagram of the protection device 1 according to the fourth embodiment is in almost all respects identical to that of FIG. 1. The elements that are identical are identified by the same reference numerals. The electrical diagram of the protection device 1 according to the fourth embodiment differs from that of FIG. 1 in that there is no discharge arrestor 4 connecting the electrical terminals 9 and 16, but a varistor 2.

Figures 9, 10, 11:
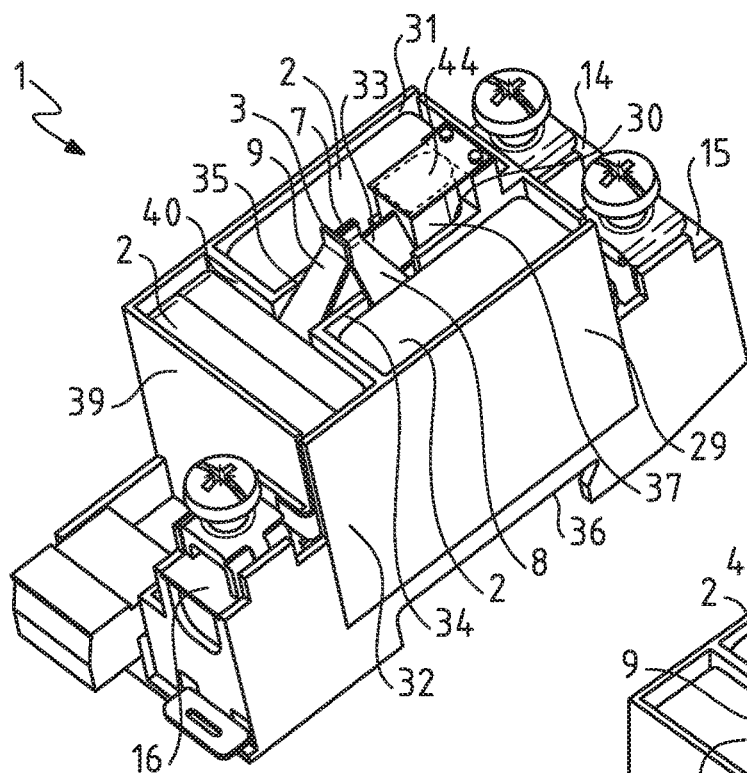
FIG. 9 is a perspective view of the overvoltage protection system of FIG. 8, in a connected state.
FIG. 10 is a perspective view of the overvoltage protection system of FIG. 8, in a disconnected state.
FIG. 11 is a perspective view of an overvoltage protection system according to a fifth embodiment of the overvoltage protection system.

The protection device 1 represented in FIGS. 9 and 10 has the electrical diagram represented in FIG. 8.

The device 1 is arranged in a housing 32 produced in plastic. The housing 32 is compartmentalized. The housing 32 has three compartments 29, 30 and 31 in the form of rectangular parallelepipeds that are parallel to one another, adjacent and separated by partitions. The housing 32 has a bottom 36 common to all three compartments 29, 30 and 31.

The central compartment 30 has two parallel partitions 34 and 35 separating it from the compartments 29 and 30.

The compartments 29 and 31 each comprise a varistor 2 of rectangular form each comprising a rectangular wafer of zinc oxide and a respective pair of electrodes also rectangular placed on either side of the zinc oxide wafer 19.

The compartments 29 and 31 are dimensioned so as to receive the varistors 2 without play between the partitions of the compartments and the electrodes of the varistors.

The device 1 further comprises a disconnection member capable of separating the respective second electrical terminals 7, 8 and 9 of the three varistors 2 upon a melting of the thermofusible braze 3. The disconnection member is positioned in the central compartment 30.

The disconnection member comprises a spring (not represented) which cooperates with a plastic insulator 33 acting as disconnection flap.

The plastic insulator 33 has a substantially rectangular form matched to the dimensions of the central compartment 30.

The plastic insulator 33 has a bottom surface cooperating with the spring placed against the bottom 36 of the central compartment 30 so as to exert an elastic return force tending to extract the plastic insulator 33 from the central compartment 30 by making it slide between the two parallel partitions 34 and 35.

The plastic insulator 33 also has a catch 37 on a portion of the surface opposite the bottom surface of the plastic insulator 33.

The plastic insulator 33 also has an insertion blade form on the other portion of the surface opposite the bottom surface of the plastic insulator 33. The insertion blade form has two parallel slopes on either side of a summit line 38 parallel to the electrodes of the varistors 2 of the compartments 29 and 31 and a third slope at right angles to the first two. The third slope is on the side opposite the catch 37 on the surface opposite the bottom surface.

The device 1 further comprises a fourth compartment 39 having a partition 40 in common with each of the compartments 29, 30 and 31.

The compartment 39 comprises a varistor 2 of rectangular form similar to those of the compartments 29 and 31 and is dimensioned so as to receive the varistor 2 without play between its walls and the electrodes of the varistors. The varistor 2 of the compartment 39 is positioned at right angles to the varistors 2 of the compartments 29 and 31. One of the electrodes of the varistor 2 is attached to the partition 40.

The plastic insulator 33 is oriented so that the third slope is oriented towards the partition 40.

The compartments 29, 31 and 39 each comprise an orifice through which the second electrodes of the varistors 2 are connected to the respective electrical terminals 14, 15 and 16.

The device 1 further comprises three flexible metal blades. Each of the metal blades is welded by a first end to the first electrode of one of the three varistors 2 so as to extend beyond the compartments 29, 31 and 39 on the side opposite the bottom 36.

Each of the metal blades corresponds to one of the electrical terminals 7, 8 and 9.

The device 1 is represented in a connected position in FIG. 9. In FIG. 9, each of the metal blades is fixed by a second end to the other two metal blades via a thermofusible braze 3.

The second end of the metal blades welded to the varistors of the compartments 29 and 31 is bent back so as to each have a flat surface portion 41 parallel to the partitions 34 and 35. The two flat surfaces 41 are positioned one on top of the other.

The second end of the metal blades welded to the varistors of the compartments 29 and 31 is bent back so as to each have a portion of flat surface 42 parallel to the partition 40 and oriented towards the partition 40.

The second end of the metal blade welded to the varistor 2 of the compartment 39 is bent back so as to have a flat surface 43 parallel to the partition 40. The flat surface 43 is positioned on the flat surfaces 43.

The flat surfaces 41, 42 and 43 are welded to one another by the thermofusible braze 3.

The slopes of the plastic insulator 33 are in contact with the metal blades fixed to one another by the thermofusible braze 3, so that the metal blades keep the plastic insulator 33 in the central compartment 30.

The device 1 further comprises a flexible tongue 44 fixed to a partition of the housing 32. The tongue 44 cooperates with the catch 37 of the plastic insulator 33 so as to keep the plastic insulator 33 in the central compartment 30.

Upon a heating up of the device 1, the thermofusible braze 3 melts and the spring placed at the bottom 36 of the housing 32 pushes back the plastic insulator 33 by making it slide into the central compartment 30.

The slopes of the plastic insulator 33 act as insertion blade pushing back each of the second ends of the metal blades, so that the electrical terminals 7, 8 and 9 are simultaneously disconnected from one another.

At the same time, the flexible tongue 44 folds down so as to no longer present an obstacle to the catch 37.

Thus, the device 1 switches into the disconnected position represented in FIG. 10, in which the electrical terminals 7, 8 and 9 are disconnected.

The positioning of the varistors 2 around the thermofusible braze 3 is particularly advantageous in that the thermofusible braze 3 is sensitive to the temperature rise of each of the varistors 2, which makes the device 1 more sensitive to thermal disconnection.

A fifth embodiment of the device 1 is represented with reference to FIG. 11. The device 1 has the same electrical diagram as that represented in FIG. 1.

The embodiment of the device represented in FIG. 11 is similar to that represented in FIGS. 9 and 10 except that the compartment 39 comprises a discharge arrestor 4 and not a varistor 2. The reference numerals of the elements that are identical are unchanged. The electrodes of the discharge arrestor 4 are connected in the same way as the electrodes of the varistor 2 of the compartment 39 of the device 1 of FIGS. 9 and 10.

The embodiment of the device represented in FIG. 11 operates in the same way as that represented in FIGS. 9 and 10 with respect to the switching of the device 1 from a connected state to a disconnected state.

In a variant of the embodiments represented with reference to FIGS. 9 to 11, the discharge arrestor 4 can be replaced by a conductive connection. The operation of the disconnection is unchanged.

Although the invention has been described in relation to several particular embodiments, it is obvious that it is in no way limited thereto and that it encompasses all the technical equivalence of the means described as well as their combinations provided the latter fall within the scope of the invention.

The use of the verb "comprise" or "include" and its conjugated forms does not exclude the presence of elements or steps other than those stated in a claim. The use of the indefinite article "a" or "an" for an element or a step does not exclude, unless stipulated otherwise, the presence of a plurality of such elements or steps.

In the claims, any reference symbol between parentheses should not be interpreted as a limitation of the claim.

What is claimed is:

1. Transient overvoltage protection system (1) intended to be positioned in parallel to an equipment item to be protected, the protection system comprising at least three lines (L, N, M) consisting of a first line (L), a second line (N) and a ground (M); the protection system (1) comprising:
    a first, a second and a third conductive branches which are intended to be connected respectively to the three lines (L, N, M) and of which each comprises a first end (14, 15, 16) intended to be connected to one of the three lines (L, N, M) and a second end (7, 8, 9) that can be connected to the second end (7, 8, 9) of the other two conductive branches;
    the first and the second conductive branches being equipped with a first (2) and a second (2, 4) voltage-sensitive protection elements; each of the first and second voltage-sensitive protection elements having two terminals (5, 10; 11, 12) and being arranged to allow a flow of current between the first and the second ends (7, 14) of the respective conductive branch when the voltage between said two terminals is higher than a voltage threshold and to inhibit a flow of current between the first and the second ends (7, 14) of the respective conductive branch when the voltage between said two terminals is lower than the voltage threshold;
    each voltage-sensitive protection element (2, 4) also being able to rise in temperature when the voltage between its terminals (5, 10) is higher than said voltage threshold; and
    a thermally sensitive disconnection device comprising at least one thermofusible element (3) which is in thermal contact with at least one of the first and second voltage-sensitive protection elements (2, 4); the thermofusible element (3) being electrically conductive at ambient temperature and being capable of melting above a temperature threshold; the thermofusible element (3) being arranged so as to keep the second ends (7, 8, 9) of the three branches in a connected position in which an electrical connection is assured between the second ends (7, 8, 9) of the first, second and third conductive branches; the thermally sensitive disconnection device comprising an elastic return device exerting a force tending to bring the first, second and third conductive branches to a disconnected position in which the second ends (7, 8, 9) of the first, second and third conductive branches are placed at a distance from one another so as to simultaneously disconnect the first, second and third branches from one another upon the melting of the thermofusible element (3).

2. Protection system (1) according to claim 1, in which the second ends (7, 8, 9) of the first, second and third conductive branches are fixed to one another by the thermofusible element (3).

3. Protection system (1) according to claim 2, in which the second ends (7, 8, 9) of the first, second and third conductive branches can move away from one another.

4. Protection system (1) according to claim 3, in which the return device comprises a disconnection flap pressed elastically on to the second ends (7, 8, 9) of the three conductive branches at their fixing point in order to exert a force tending to separate the second ends (7 and 9, 8) of the three conductive branches from one another.

5. Protection system (1) according to claim 4, in which the first and the second protection elements are positioned on either side of the disconnection flap.

6. Protection system (1) according to claim 3, in which the first and the second conductive branches are positioned on either side of the disconnection flap.

7. Protection system (1) according to claim 3, in which two of the three conductive branches are positioned in a direction parallel to one another and the last of the three conductive branches is positioned in a direction at right angles to the other two conductive branches, the second ends of each of the conductive branches being inclined to one another so as to be held together by the thermofusible element, and the disconnection flap has a profile bevelled by three slopes at right angles to one another in order for this profile to complement the assembly formed by the inclination of each of the second ends of the conductive branches and capable of being inserted between the three second ends of the conductive branches upon the melting of the thermofusible element.

8. Protection system (1) according to claim 2, in which the second end (8, 9) of the third conductive branch is inserted between the second ends (7, 8) of the first and second conductive branches and in which the return device comprises a return member (13) exerting on the second end (8, 9) of the third conductive branch a force tending to separate said second end (8, 9) of the third conductive branch from the second ends (7 and 9, 8) of the first and second conductive branches.

9. Protection system (1) according to claim 8, in which the second ends (7, 9) of the first and second conductive branches are placed at a distance from one another in the connected position.

10. Protection system (1) according to claim 9, in which the thermofusible element (3) is a solid tin-based alloy ball ensuring an electrical connection between the second ends (7, 8) of the first and second conductive branches and covered by a thermofusible material (6) capable of melting upon a temperature rise and of being allocated to one of the terminals (5) of one and/or the other of the first and second voltage-sensitive protection elements (2) upon a temperature rise in order to increase the wettability of said terminal (5) for the molten tin alloy.

11. Protection system (1) according to claim 8, in which the return device further comprises a return member (113) exerting on the second end (9) of the second conductive branch a force tending to separate the second end (9) of the second conductive branch from the second end (8) of the first conductive branch.

12. Protection system (1) according to claim 1, the third conductive branch being equipped with a third voltage-sensitive protection element having two terminals and being arranged to allow a flow of current between the first and the second ends of the third conductive branch when the voltage between said two terminals is higher than a voltage threshold and to inhibit a flow of current between the first and the second ends of the conductive branch when the voltage between said two terminals is lower than the voltage threshold; and being also capable of rising in temperature when the voltage between its terminals is higher than said voltage threshold.

13. Protection system (1) according to claim 1, in which the thermally sensitive disconnection device comprises a first and a second thermofusible elements (3), the first thermofusible element being positioned between a first portion and a second portion of the first conductive branch; the first portion and the second portion respectively comprising the first end (14, 15, 16) and the second end (7, 8, 9) of the first conductive branch;

the second thermofusible element being positioned between a first portion and a second portion of the second conductive branch; the first portion and the second portion respectively comprising the first end (14, 15, 16) and the second end (7, 8, 9) of the second conductive branch;

the return device comprising a first return member (113) exerting on the second portion of the first conductive branch a force tending to separate it from the first portion of the first conductive branch so as to separate the first portion from the second portion of the first conductive branch upon the melting of the first thermofusible element (3) and a second return member (113) exerting on the second portion of the second conductive branch a force tending to separate it from the first portion of the second conductive branch so as to separate the first portion from the second portion of the second conductive branch upon the melting of the second thermofusible element (3); the second end (9) of the third conductive branch being in connected position sandwiched between the second ends (7, 8) of the first and second conductive branches; the return device further comprising a third return member (13) exerting on the second end (9) of the third branch a force tending to separate the second end (9) of the third conductive branch from the second ends (7, 8) of the first and of the second conductive branches so as to move the second end (9) of the third conductive branch in relation to the second ends (7, 8) of the first and second conductive branches when, because of the melting of one and/or the other of the two thermofusible elements (3), the second end (9) of the third conductive branch is no longer sandwiched between the second ends (7, 8) of the first and second conductive branches.

14. Protection system (1) according to claim 13, in which the first and the second conductive branches comprise a third and a fourth voltage-sensitive protection elements (2 and 4), the first and the second voltage-sensitive protection elements (2 and 4) being respectively positioned on the first portion of the first and of the second conductive branches and the third and the fourth voltage-sensitive protection elements (2, 4) being respectively positioned on the second portion of the first and of the second conductive branches.

15. Protection system according to claim 14, in which the first thermofusible element (3) is fixed between one of the terminals of the first voltage-sensitive protection element (2) and one of the terminals of the third voltage-sensitive protection element (4) and in which the second thermofusible element is fixed between one of the terminals of the second voltage-sensitive protection element (2, 4) and one of the terminals of the fourth voltage-sensitive protection element.

16. Protection system according to claim 1, in which the voltage-sensitive protection elements are chosen from varistors (2) and gas discharge arrestors (4).

17. Protection system according to claim 1, in which the first end (14) of the first conductive branch is intended to be connected to the phase (L).

18. Protection system according to claim 1, in which the first end (15, 16) of the second conductive branch is intended to be connected to the neutral (N) or to the ground (M).

* * * * *